United States Patent [19]

Kursinsky

[11] Patent Number: 5,611,324

[45] Date of Patent: Mar. 18, 1997

[54] CAMERA ACTUATING ARCHERY APPARATUS

[76] Inventor: Steven D. Kursinsky, 220 W. Walker, Sandusky, Mich. 48471

[21] Appl. No.: 535,948

[22] Filed: Sep. 28, 1995

[51] Int. Cl.$^6$ ........................................ F41B 5/14
[52] U.S. Cl. ........................................ 124/86
[58] Field of Search .............. 124/1, 23.1, 86, 124/88; 354/75, 76, 82, 266, 269, 293

[56] References Cited

U.S. PATENT DOCUMENTS

| | | | |
|---|---|---|---|
| 1,805,185 | 5/1931 | Ramsey | 354/269 |
| 4,296,725 | 10/1981 | Broderick | 124/23.1 |
| 4,643,159 | 2/1987 | Ryan | 124/88 |
| 4,794,414 | 12/1988 | Kozina et al. | 354/269 |
| 5,160,955 | 11/1992 | Nihls et al. | 354/269 |

Primary Examiner—Randolph A. Reese
Assistant Examiner—John A. Ricci
Attorney, Agent, or Firm—John P. Moran

[57] ABSTRACT

A camera actuating archery apparatus including an archery bow having a bowstring for use in shooting an arrow, and a camera. The camera has an exposed actuating button, a connector for attaching the camera to the archery bow, an actuating mechanism, and a string between the actuating mechanism and the arrow serving to cause the actuating mechanism to depress the exposed actuating button in response to release of the arrow. In an alternate embodiment, the camera is mounted in a housing having the connector and the actuating mechanism secured thereon.

17 Claims, 1 Drawing Sheet

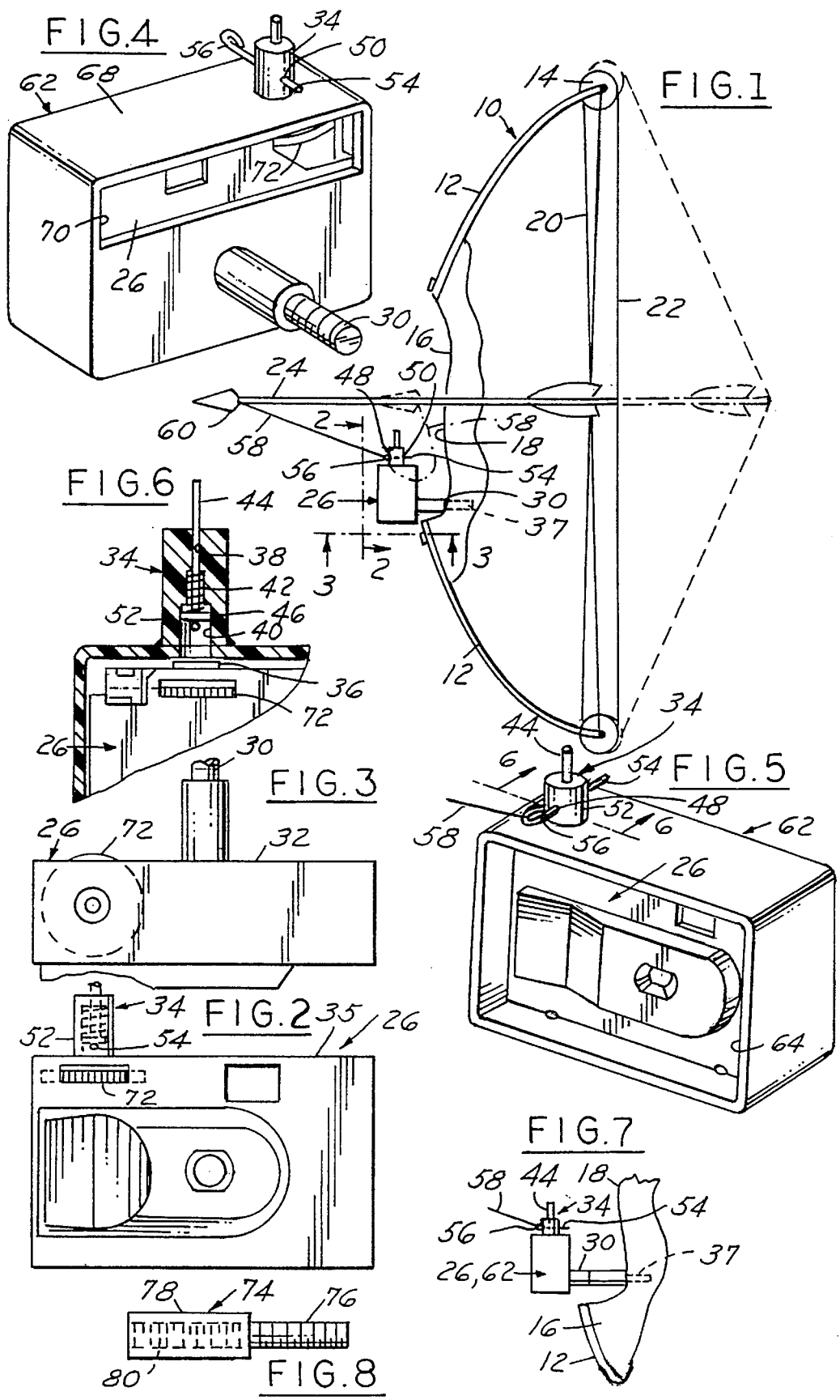

CAMERA ACTUATING ARCHERY APPARATUS

TECHNICAL FIELD

This invention relates generally to hunting with a bow and arrow and, more particularly, to a camera actuating archery apparatus.

BACKGROUND ART

For many bow and arrow hunters, it is highly desirable to take photographs of any game toward which they shoot their arrows. It is extremely difficult and a cause for inaccuracy for a single hunter to attempt to actuate a camera to take a picture while shooting an arrow with a bow. And, of course, coordinating the timing of the camera actuation with the release of the bow is important, since any early camera shutter noise may cause the target animal to move before the arrow can be released.

Ryan U.S. Pat. No. 4,643,159 discloses an automatic camera actuating apparatus for use on an archery bow, wherein the string and eccentrically mounted cams of a bow, in conjunction with cooperating cables and a microswitch, are adapted to electrically actuate a camera shutter upon release of the arrow. Alternately, Ryan utilizes an electric eye to actuate the camera. In a further embodiment, Ryan discloses a mechanical shutter tripper actuator, including a plunger assembly having a rod and an enlarged end slidably mounted in a housing supported by a bracket. A tube and enclosed cable extends from the housing to a connector into the camera. Release of the bow string contacts the enlarged end of the plunger assembly to thereby move the tube and cable to actuate the camera.

DISCLOSURE OF THE INVENTION

A general object of the invention is to provide an improved camera actuating archery apparatus involving an archery bow.

Another object of the invention is to provide a simplified, compact and efficient camera actuating archery apparatus.

A further object of the invention is to provide a camera actuating archery apparatus, including a threaded extension integrally molded on the back of a camera for connection on a bow riser, and a plunger housing integrally molded on the top of the camera over the camera actuating button.

A still further object of the invention is to provide such a camera actuating archery apparatus, wherein the plunger housing has a two-diameter axial opening formed therethrough, a rod is mounted in the axial opening with a flange on the inner end thereof for supporting a spring in the larger diameter opening; lateral aligned openings are formed through oppositely disposed side walls of the housing adapted to receive an eyelet-type pin across the face of the flange to hold the spring in a compressed condition above the camera actuating button; and a string is connected between the eyelet and the arrow tip.

A still further object of the invention is to alternately provide a housing for a camera, wherein the housing includes the threaded extension and the plunger housing.

BRIEF DESCRIPTION OF THE DRAWINGS

FIG. 1 is a side elevational view of a bow and arrow embodying the invention;

FIGS. 2 and 3 are cross-sectional views taken along the planes of the lines 2—2 and 3—3 of FIG. 1, respectively, and looking in the directions of the arrows;

FIG. 4 is a perspective view of a housing holding a camera, and having a threaded extension and a plunger housing secured thereon;

FIG. 5 is a perspective view of the housing in FIG. 4, from the opposite side thereof, and illustrating the camera enclosed therein;

FIG. 6 is an enlarged cross-sectional view taken along the plane of the line 6—6 of FIG. 5, and looking in the direction of the arrows;

FIG. 7 is a fragmentary portion of the FIG. 1 structure illustrating an alternate embodiment for holding the camera; and FIG. 8 is a side elevational view of an element of the FIG. 7 structure.

BEST MODE FOR CARRYING OUT THE INVENTION

Referring now to the drawings in greater detail, FIG. 1 illustrates an archery bow 10 including two flexible bow elements 12 having eccentrically mounted cams 14 mounted on the oppositely disposed outer ends thereof, and a riser 16 including a handle 18 connected between the inner ends of the two bow elements 12. Cables 20 extend around the eccentrically mounted cams 14, and a bow string 22 is attached to the ends of the respective cables. An arrow 24 is shown in its initial position across the riser 16 with the rear end thereof adjacent the bow string 22.

As shown in FIGS. 2 and 3, a camera 26, preferably of the single use type, includes a threaded extension 30 integrally molded on the back wall 32 of the camera, and a plunger housing 34 integrally molded on the top wall 35 thereof above the usual camera actuating button 36. A threaded opening 37 (FIG. 1) is formed in the riser 16 for threadedly receiving the threaded extension 30.

As illustrated in FIG. 6, an axial opening 38 and an axially aligned counterbore 40 are formed through the plunger housing 34. A coil spring 42 is mounted around a rod 44 above a spring retainer flange 46 formed on the end of the rod in the counterbore 40. The rod 44 extends out through the opening 38. Oppositely disposed aligned openings 48 and 50 (FIG. 1) are formed through the annular wall 52 (FIG. 2) of the housing 34. With the rod 44 lifted to compress the spring 42, a pin 54 is mounted through the aligned openings 48 and 50 below the flange 46. An eyelet 56 (FIG. 1) is formed on one end of the pin 54. A string 58 is connected at one end thereof to the eyelet 56 and at the other end thereof to the tip 60 of the arrow 24. The length of the string 58 is such that it is taut between the eyelet 56 and the tip 60 with the arrow 24 in its initial position across the riser 16.

In operation, upon the arrow 24 being pulled back and released, as it passes its original initial position the string 58 pulls the pin 54 from the openings 48 and 50, releasing the spring 42, causing the flange 48 to be projected against the camera actuating button 36, to thereby take the desired picture.

As shown in FIGS. 4 and 5, in the event it is not possible or practical to integrally mold the threaded extension 30 and the plunger housing 34 onto the camera 26, a separate camera housing 62 may be formed with an open side 64 for receiving the camera. In this embodiment, the threaded extension 30 is secured in any suitable manner, such as by welding, to a back wall 66 of the housing 62. The plunger housing 34 is secured in any suitable manner, such as by welding, to a top wall 68 of the camera housing 62. The plunger housing 34 on the housing 34 is positioned so as to be directly above the camera actuating button 36. An open section 70 (FIG. 4) is formed between the back wall 66 and the top wall 68 to provide access to the usual film advance wheel 72 of the camera 26.

Where a stabilizer 74 (FIGS. 7 and 8) with an externally threaded end 76 is mounted in the threaded opening 37 of the riser 16, the distal end 78 of the stabilizer is formed to include a threaded opening 80 adapted to receive the threaded extension 30 on the camera 26 or on the camera housing 62.

INDUSTRIAL APPLICABILITY

It should be apparent that the invention provides a simplified, compact and efficient camera actuating archery apparatus, which may be integral with a camera, or formed as a separate housing adapted to hold and actuate a standard camera.

While but two general embodiments of the invention have been shown and described, other modifications thereof are possible within the scope of the following claims.

What is claimed is:

1. A camera actuating archery apparatus comprising an archery bow having a bowstring for use in shooting an arrow, a camera having an exposed actuating button, attaching means for attaching said camera to said archery bow, and actuating means operatively connected between said arrow and said exposed actuating button for contacting and depressing said exposed actuating button in response to release of said arrow.

2. The camera actuating archery apparatus described in claim 1, wherein said attaching means includes threaded means for connecting said camera to said bow.

3. The camera actuating archery apparatus described in claim 2, wherein said threaded means includes a threaded extension integrally formed on said camera, and a threaded opening formed in said bow.

4. The camera actuating archery apparatus described in claim 1, wherein said attaching means includes a camera housing adapted to receive said camera, a threaded extension formed on said camera housing, and a threaded opening formed in said bow.

5. The camera actuating archery apparatus described in claim 1, wherein said bow includes a riser, and said attaching means includes threaded means for connecting said camera to said riser.

6. The camera actuating archery apparatus described in claim 5, and a stabilizer removably secured to said riser, and said attaching means includes threaded means for connecting said camera to said stabilizer.

7. The camera actuating archery apparatus described in claim 1, wherein said actuating means includes a plunger housing integrally formed on said camera over said exposed actuating button, a spring-loaded plunger movably mounted in said plunger housing, a pin removably mounted through said plunger housing for retaining said spring-loaded plunger in a compressed condition above said actuating button, and a string connected between said pin and said arrow.

8. The camera actuating archery apparatus described in claim 7, wherein said plunger housing has smaller and larger axial openings formed therethrough with a shoulder therebetween, and said spring-loaded plunger includes a rod extending through said smaller axial opening into said larger axial opening, a spring retainer flange formed on the end of said rod, a coil spring mounted around said rod between said flange and said shoulder, and said pin is positioned adjacent said flange.

9. The camera actuating archery apparatus described in claim 7, wherein said arrow includes a forward tip, and said string is connected to said forward tip.

10. The camera actuating archery apparatus described in claim 1, wherein said actuating means includes a camera housing, a plunger housing formed on said camera housing over said exposed actuating button, a spring-loaded plunger movably mounted in said plunger housing, a pin removably mounted through said plunger housing for retaining said spring-loaded plunger in a compressed condition above said actuating button, and a string connected between said pin and said arrow.

11. A camera actuating archery apparatus for a camera and an archery bow including a riser, a bow string, and an arrow having a forward tip thereon, said apparatus comprising a camera connector between said camera and said riser, and a camera actuator operatively connected between said camera and said forward tip of said arrow.

12. The camera actuating archery apparatus described in claim 11, wherein said connector includes a threaded extension operatively connected to said camera, and a threaded opening formed in said riser.

13. The camera actuating archery apparatus described in claim 12, wherein said threaded extension is integrally formed on said camera.

14. The camera actuating archery apparatus described in claim 12, wherein said connector includes a camera housing for receiving said camera, and said threaded extension is fixedly secured on said camera housing.

15. The camera actuating archery apparatus described in claim 11, wherein said camera includes an outer actuating button, and said actuator includes a plunger housing integrally formed on said camera over said outer actuating button, a spring-loaded plunger movably mounted in said plunger housing, a pin removably mounted through said plunger housing for retaining said spring-loaded plunger in a compressed condition above said actuating button, and a string connected between said pin and said arrow tip.

16. The camera actuating archery apparatus described in claim 15, wherein said plunger housing has smaller and larger axial openings formed therethrough with a shoulder therebetween, and said spring-loaded plunger includes a rod extending through said smaller axial opening into said larger axial opening, a spring retainer flange formed on the end of said rod, a coil spring mounted around said rod between said flange and said shoulder, and said pin is positioned adjacent said flange.

17. The camera actuating archery apparatus described in claim 11, and a stabilizer removably secured to said riser, and said connector includes threaded means operatively connected between said camera and said stabilizer.

* * * * *